March 9, 1965 M. O. DE VOS 3,172,696
WHEELED CHILD'S VEHICLE
Filed July 18, 1963 3 Sheets-Sheet 3
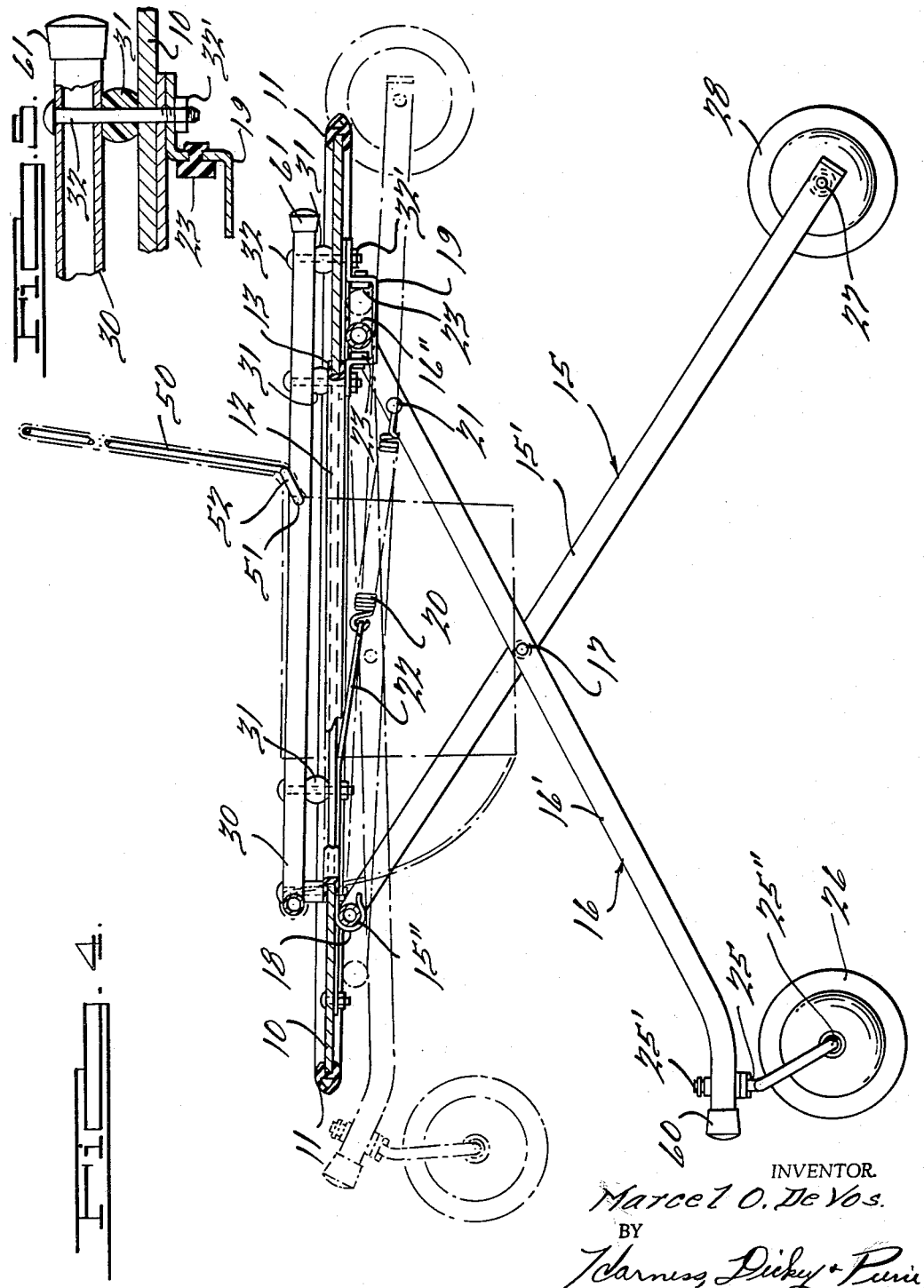
INVENTOR.
Marcel O. De Vos.
BY
Harness, Dickey & Pierce
ATTORNEYS.

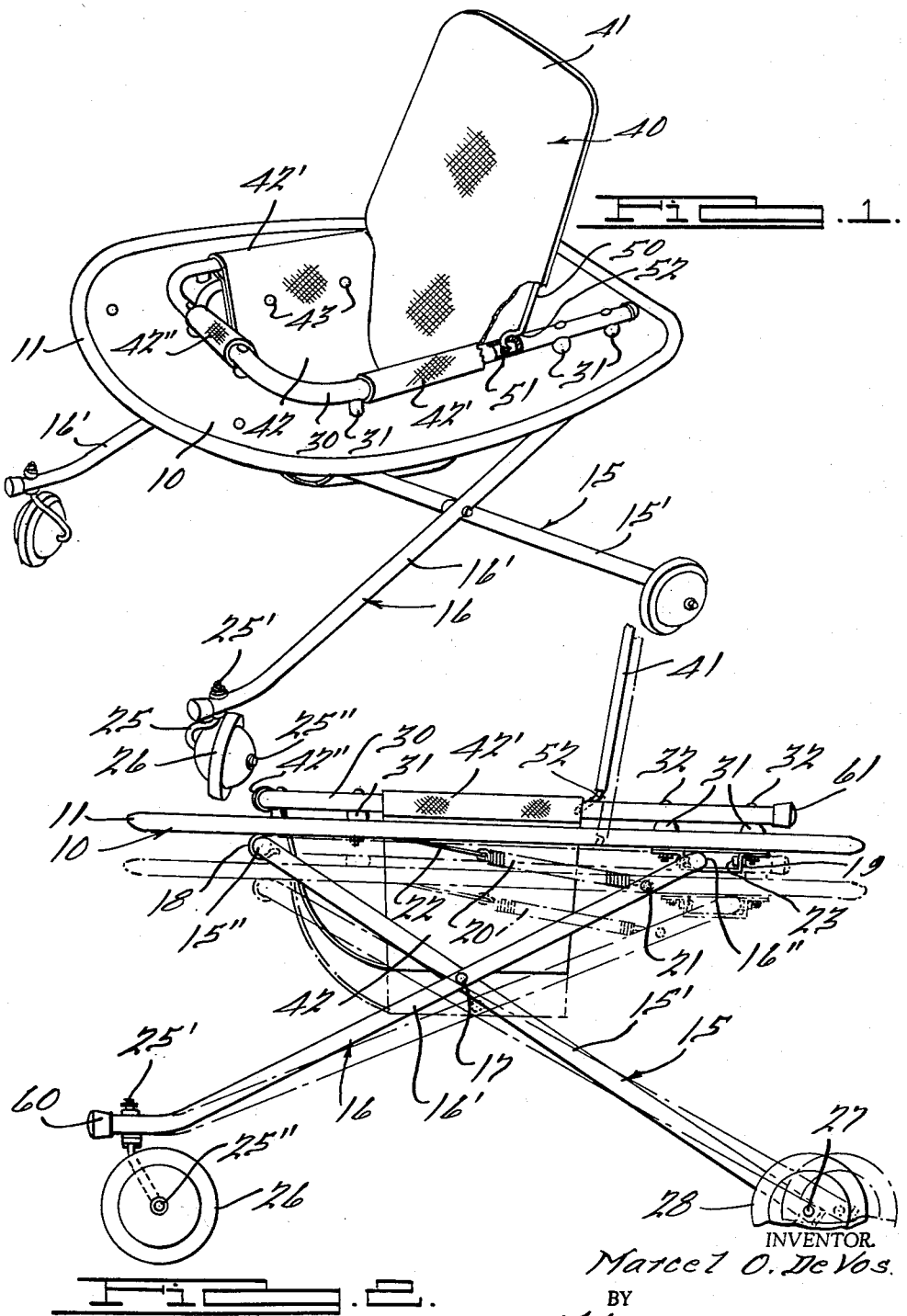

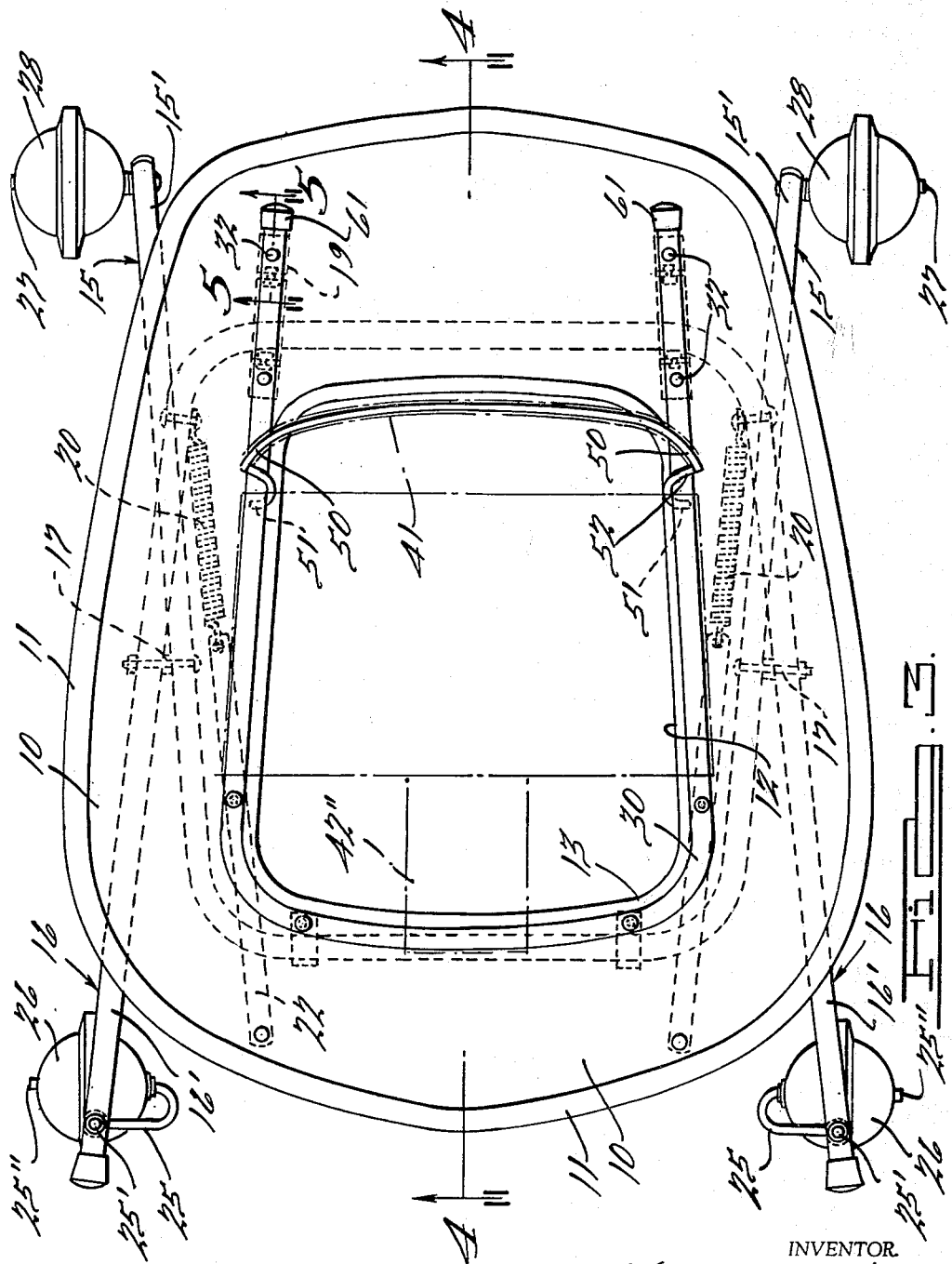

3,172,696
WHEELED CHILD'S VEHICLE
Marcel O. De Vos, 19922 E. William Court,
Grosse Pointe Woods, Mich.
Filed July 18, 1963, Ser. No. 295,958
7 Claims. (Cl. 297—16)

This invention relates to a wheeled child's vehicle of the baby walker type and more particularly to improvements therein whereby the vehicle may partake of a bouncing movement in an up and down direction.

One of the objects of this invention is to provide a baby walker of this type which is so reduced in the number and character of its component parts as to approach the ultimate in structural simplicity.

Another object of the invention is to provide a device of this type wherein its structural simplicity creates an economy in its manufacture, installation and maintenance.

Another object of the invention is to provide a device of this character which may be quickly and easily folded into a flat, compact condition so that it may be readily carried or stored.

Still another object of this invention is to provide a simple and inexpensive hinge construction between the seat back and body which embodies means for effectively supporting and retaining the seat back in its raised, operative position and which also readily permits the seat back to be moved to its folded, inoperative position.

Various other objects and advantages, and the novel details of construction of one commercially practical embodiment of the invention will become more apparent as the description proceeds, especially when considered in connection with the accompanying drawings, in which:

FIGURE 1 is a perspective view of a baby walker constructed in accordance with this invention;

FIGURE 2 is a side elevational view of the device, showing the bouncing movement thereof in dot and dash lines;

FIGURE 3 is a top plan view of the device;

FIGURE 4 is a longitudinal sectional view taken substantially on the plane indicated by line 4—4 in FIGURE 3; and FIGURE 5 is a detail sectional view taken on line 5—5 in FIGURE 3.

The device of this invention comprises a body 10 which is preferably, although not necessarily, of an elongated oval shape in plan view. The body may be made of any suitable material such as Masonite, wood, plastic, or any other suitable stiff material. The periphery of the body 10 is preferably provided with a rubber bumper 11 which is clinched, cemented or otherwise securely fastened thereto. The body, at its approximate center, is provided with an opening 12 to receive the occupant of the device. The periphery of this opening is preferably provided with a finishing strip 13 which also may be clinched or cemented thereto.

The device is designed not only to provide an adequate baby walker but also to provide the added function of bouncing so that the baby or occupant may cause the device to bounce up and down. To this end, the device is provided with two pair of leg members 15 and 16, each of which is in the form of a substantially inverted U-shaped member. These leg members are arranged in crossed relation and the legs 15' and 16' of the leg members 15 and 16 are pivotally connected together as at 17 at their point of intersection. Thus, the leg members 15 and 16 may partake of a folding or scissor-like movement which is permitted by the type of connection between the leg members 15 and 16 and the body 10.

The bight portion 15" of the leg member 15 is adapted to engage a spring clip 18 secured to the bottom of the body 10. The bight portion 16" of the leg member 16 is slidably connected to the body 10 by means of a bracket 19 secured to the body 10. While the bracket 19 provides a sliding connection for one of the leg members, the clip 18 provides a pivotal connection for the other leg member. Preferably two clips 18 and two brackets 19 are employed.

The folding or scissor-like movement of the leg members is normally resisted by springs 20 (two being generally employed), one end of each spring being connected to one of the legs 16' as at 21, and the other end being connected to a steel strap 22 secured to the body 10.

These springs 20 maintain the leg members 15 and 16 substantially in the position illustrated in FIGURES 1 and 4 and in full lines in FIGURE 2. In this position the bight 16" of the leg member 16 is in the left-hand end of the bracket 19. If desired, the ends of the bracket 19 may be provided with rubber bumpers 23 in the form of button-like members inserted in apertures in the bracket member 19.

The free ends of the leg member 16 are apertured to rotatably receive an axle member 25 in the form of a rod. The upper end 25' of each rod extends through a vertical opening in the end of the leg member, is rotatably mounted therein and is secured thereto. The other end 25" is bent horizontally to provide an axle portion for rotatably mounting a wheel 26. Thus, the wheels 26 may swivel about the portions 25' so that the vehicle may be guided. Rotatably secured on axles 27 on the ends of the rear leg members 15 are wheels 28. Any desired style or form of wheels may be employed, although the style herein illustrated has been found to be eminently satisfactory.

Mounted in spaced relation to the body 10 is a supporting tube or member 30. This supporting tube or member 30 serves the purpose of partially supporting the flexible seat member and for reinforcing the body 10. The supporting tube 30 is substantially U-shaped in plan view and is spaced from the body 10, as illustrated in FIGURES 1, 2 and 4 by spacer sleeves 31. These spacer sleeves may be made of plastic, rubber or any suitable material. The supporting member 30 acts as an anchor for the attaching bolts by means of which the various parts are secured to the body 10. Thus, as shown in FIGURES 2 and 5, the bolts 32 which secure the bracket 19 to the body 10 pass through the supporting tube 30, thence through the spacer sleeves 31, thence through the body 10, and through the bracket 19. These bolts are secured in place by means of nuts or the like 32'. The same type of construction just described is employed for attaching the spring clip 18 to the body 10 and for attaching the strap member 22 to the body 10. With this construction just described, the stresses and strains applied to the attached parts are taken by the supporting tube 30 and not by the body 10 alone. This provides a very practical and satisfactory means for adequately supporting the bracket 19, spring clip 18 and strap 22, without making the body 10 unduly thick and heavy.

The reference character 40 indicates a flexible seat cover which has a back portion 41 and a seat portion 42. The sides 42' of the seat portion are looped over the supporting tube 30 and secured thereto by snap fasteners 43. The front portion 42" of the seat portion, which would extend between the legs of the occupant, is looped over the front portion of the supporting tube 30 shown best in FIGURE 1 and secured thereto by snap fasteners (not shown).

The reference character 50 indicates a back frame which is in the form of an inverted substantially U-shaped member having free ends 51, which are pivotally connected to the supporting tube 30 by means of apertures therein. The U-shaped frame member 50 may be conveniently formed of a wire or rod bent into a substantially inverted U-shape and the back 41 of the seat cover 40 is telescoped thereover as shown best in FIGURE 1.

In order to hold the back frame in its vertical operative position, the legs of the inverted U-shaped member adjacent the free ends 51 thereof are bent to form laterally offset portions 52 adapted to engage the supporting tube 30 as the frame 50 is inclined backwardly. Thus, by the engagement of the offset portions 52 with the supporting tube 30, as shown in FIGURES 1, 2 and 4, the back frame is held in its substantially vertical position which is its operative position. When the device is to be collapsed, the back frame is swung forwardly about its pivoted free ends 51 so as to lie substantially flush with the supporting tube 30 and body 10.

When it is desired to completely collapse the device, the bight 15" of the leg member 15 is disengaged from the spring clips 18 so that the leg members 15 and 16 may be completely collapsed, as shown by dot and dash lines in FIGURE 4. In this position, with the back frame 50 folded down, the device presents a compact package which may be readily carried or stored away. To bring the parts again to their operative position, the bight 15" of the leg member 15 is moved so as to engage the spring clips 18.

When the occupant of the vehicle bounces up and down, the bight 16" of the leg member 16 will move in bracket 19 to permit the wheels 26 and 28 to move apart and the body 10 to assume the dot and dash position illustrated in FIGURE 2. This scissor-like movement of the leg members 15 and 16 is permitted but resisted by the springs 20, as will be apparent, and when the bouncing agitation of the occupant has ceased, the springs 20 will cause the leg members to assume the full line position illustrated in FIGURES 2 and 4.

The free ends of the leg member 16 is preferably provided with bumper members 60 and the rear ends of the supporting tube 30 are preferably provided with finishing caps 61.

From the foregoing, it will be apparent that there is provided a child's vehicle of the baby walker type which is so reduced in the number and character of its component parts as to approach the ultimate in structural simplicity, while at the same time providing a rugged, sturdy structure which is able to withstand the rigors of use by children. Also, without undue complication, a baby walker type of vehicle is provided with the added function of being able to bounce up and down, thus adding to the delight of the occupant.

While a commercially practical embodiment of the invention has been described and illustrated herein somewhat in detail, it will be understood that various changes may be made as may come within the purview of the accompanying claims.

What is claimed is:

1. In a device of the class described, a body, a seat member for occupants of the device, a pair of crossed leg members pivotally connected together at their point of intersection whereby they may partake of a scissor-like movement when the occupant bounces up and down, spring means connecting one of said leg members to said body to normally resist said scissor-like movement, a supporting tube carried by said body and supporting said seat member, a pivotal connection for one leg member carried by said body, a sliding connection for the other leg member carried by said body, and fastening elements for said pivotal and sliding connections extending through said supporting tube and body, whereby the strains and stresses applied to said fastening elements are taken by said supporting tube and not by the body alone.

2. In a device of the class described, a body, a seat member for occupants of the device, a pair of substantially inverted U-shaped leg members having their legs arranged in crossed relation, means pivotally connecting said leg members at their point of intersection whereby said leg members may partake of a folding scissor-like movement, a supporting tube carried by said body to which said seat member is attached, a clip member pivotally connecting the bight of one of said leg members to said body, a bracket slidably connecting the bight of the other leg members to said body, and fastening means for said clip member and bracket extending through said supporting tube and body, whereby the forces applied to said clip member and bracket are taken mainly by said supporting tube.

3. A device as described in claim 2 in which spring means connect one of said leg members to said body to normally resist said folding scissor-like movement.

4. A device as described in claim 2 in which wheels are attached to the ends of the legs of said U-shaped leg members.

5. In a device of the class described, a body, a pair of substantially inverted U-shaped leg members having their legs arranged in crossed relation, means pivotally connecting said leg members at their point of intersection whereby said leg members may partake of a folding scissor-like movement, spring means connecting one of said leg members to said body to normally resist said scissor-like movement, a supporting tube secured to the top of said body, a seat member secured to said tube, a clip member secured to the bottom of said body for pivotally connecting the bight of one of said leg members thereto, said clip member having an open end whereby said leg member may be disengaged therefrom, a bracket secured to the bottom of said body for slidably connecting the bight of the other leg member to said body whereby said leg members may partake of a scissor-like movement when the occupant bounces up and down, and fastening means for said clip member and bracket extending through said body and supporting tube whereby the forces applied to said clip member and bracket are taken mainly by said supporting tube.

6. In a device of the class described, a body, a pair of substantially inverted U-shaped leg members having their legs arranged in crossed relation, means pivotally connecting said leg members at their point of intersection whereby said leg members may partake of a folding scissor-like movement, a supporting tube secured to the top of said body, a seat member supported by said supporting tube, a clip member secured to the bottom of said body for pivotally connecting the bight of one of said leg members thereto, said clip member having an open end whereby said leg member may be disengaged therefrom when it is desired to collapse the device, a bracket having closed ends secured to the bottom of said body for slidably connecting the bight of the other leg member to said body whereby said leg members may partake of a scissor-like movement when the occupant bounces up and down, a spring connected to said second mentioned leg member for holding said leg members in normal position, a strap-like member connecting one end of said spring to the bottom of said body, and fastening means for said clip member, bracket, and strap-like member extending therethrough and through said body and supporting tube whereby the forces applied to said clip member, bracket and strap-like member are taken mainly by said supporting tube.

7. A structure as described in claim 6 in which rubber bumpers are secured to the closed ends of said bracket.

References Cited by the Examiner
UNITED STATES PATENTS

| | | | |
|---|---|---|---|
| 633,762 | 9/99 | Kade | 108—120 |
| 725,167 | 4/03 | Southard | 297—56 |
| 1,708,632 | 4/29 | Podiebrad | 248—399 |
| 2,626,845 | 1/53 | Dubach | 108—27 |
| 2,728,377 | 12/55 | Thompson | 297—137 |
| 2,798,641 | 7/57 | Coddington | 108—117 |
| 2,828,804 | 4/58 | Schwinn | 108—112 |
| 3,007,667 | 11/61 | Rossi | 248—401 |
| 3,048,440 | 8/62 | McPherson | 297—33 |
| 3,083,050 | 3/63 | Gill | 297—5 |

FOREIGN PATENTS

| | | |
|---|---|---|
| 184,691 | 2/56 | Austria. |
| 2,098 | 1953 | Great Britain. |
| 853,722 | 11/60 | Great Britain. |

FRANK B. SHERRY, *Primary Examiner.*

UNITED STATES PATENT OFFICE

CERTIFICATE OF CORRECTION

Patent No. 3,172,696                          March 9, 1965

Marcel O. De Vos

It is hereby certified that error appears in the above numbered patent requiring correction and that the said Letters Patent should read as corrected below.

Column 4, line 20, for "members" read -- member --; column 6, line 9, for "2,098    1953    Great Britain" read -- 2,098    1853    Great Britain --.

Signed and sealed this 27th day of July 1965.

(SEAL)
Attest:

ERNEST W. SWIDER                      EDWARD J. BRENNER
Attesting Officer                       Commissioner of Patents